UNITED STATES PATENT OFFICE.

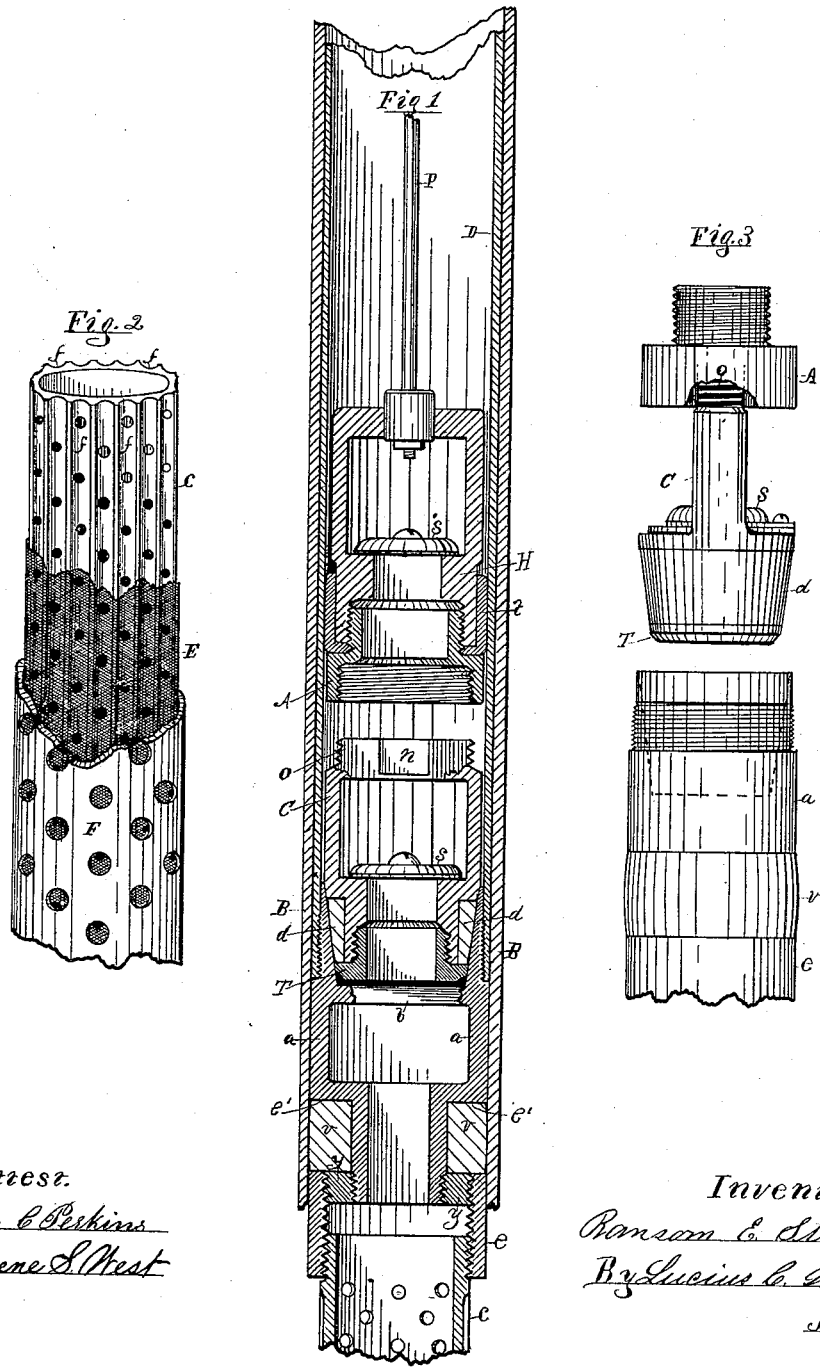

RANSOM E. STRAIT, OF GALESBURG, MICHIGAN.

TUBULAR WELL.

SPECIFICATION forming part of Letters Patent No. 269,244, dated December 19, 1882.

Application filed December 5, 1881. (No model.)

*To all whom it may concern:*

Be it known that I, RANSOM E. STRAIT, a citizen of the United States, residing at Galesburg, county of Kalamazoo, State of Michigan, have invented new and useful Improvements in Tubular Wells, of which the following is a specification.

My invention has for its object certain improvements in tubular wells, hereinafter described, and pointed out in the claims.

In the drawings forming a part of this specification, Figure 1 is a longitudinal section of a tubular well; Fig. 2, a sieve or filter-pipe; and Fig. 3, a detached portion, showing the mode of removing the valve-joint.

B is the main well-pipe; D, the brass cylinder, and $a$ $a$ the joint coupled with the lower end thereof; P, the plunger; H, upper valve-joint, and C lower valve-joint. I thread the inner surface of the joint H, connecting with the plunger-rod, or connect with this joint a joint, A, likewise threaded, and also form threads $o$ on bale $n$ in a manner that plunger P, after being uncoupled from the handle of the pump above, may be lowered and turned around in the cylinder, coupling parts A and $n$ together, as in Fig. 3. A portion of rim A is broken away in this figure to show the threads $o$ on bale $n$. The order of the thread on parts A and $n$ may be reversed, the former screwing into joint C instead of around it; or, in place of the thread, other modes may be adopted, whereby the parts can be readily and detachably connected together for the purpose set forth.

In order to obviate any danger of breaking, the frail plunger-joint C should have no very rigid connection with other parts to be unlocked by means of said plunger. This is provided for by forming a funnel-shaped seat or recess to receive the tapered end of said joint. In the drawings this seat is formed in the upper end of joint $a$ $a$. In some instances it might be desirable to form it in the main pipe direct. To insure a close fit the tapered end of joint C is provided with a leather packing-rim, $d$, which is held in its recess by cap T. This cap may be detachably connected with joint C, as in Fig. 1, or otherwise. By this arrangement joint C, bearing the lower valve, S, may be dropped into place from the mouth of the well-pipe B, and readily removed, as above specified, by means of the plunger.

A similar method of raising valves by means of the plunger, so far as the construction of the coupling parts is concerned, has been in use, but not to my knowledge in connection with the lower valve-joint and its seat, whereby the plunger may be used for this purpose in all kinds of tubular wells.

$y$ is a detachable band screwed on the joint to admit of the locking-band $r$ being located in its recess, and also to hold it therein. The contraction of the band $r$ is effected by the upward pressure of joint $e$ and the downward pressure of shoulders $e'$ $e'$ when coupling said parts together. This forces the outer surface of the band rigidly against the well-pipe. The farther joint $e$ is turned on the greater the bulging of the rubber. The band expands, disengaging itself from the pipe by its own elasticity when joint $e$ is partially turned off, or, rather, the upper parts connecting with it separate farther from it. The filter-pipe joint is prevented from turning in this operation by the engagement of the filter-pipe with the ground. Thus the cylinder and joint above are revolved until the rubber is tightly packed to prevent further turning. This method of expanding the rubber causes it to more firmly engage itself with the rough outer pipe. Different lengths of filter-pipe may be used, according to the desired location of the plunger-cylinder.

What I claim as new is—

1. The revoluble brass cylinder-joint provided with a rubber locking-band, in combination with a non-revoluble pipe-coupling, the lower end of which is adapted to press against the lower edge of said band, whereby both the band and joint are revolved in the operation of locking, for the object stated, substantially as set forth.

2. In a tubular well having the check-valve joint adapted for being detachably coupled for the purpose stated, the plunger-cylinder provided with the conical seat, in combination with said check-valve joint, having the conical end fitting closely yet detachably in said seat.

RANSOM E. STRAIT.

Witnesses:
E. W. DEYOE,
WM. M. DEYOE.